Figure 2:
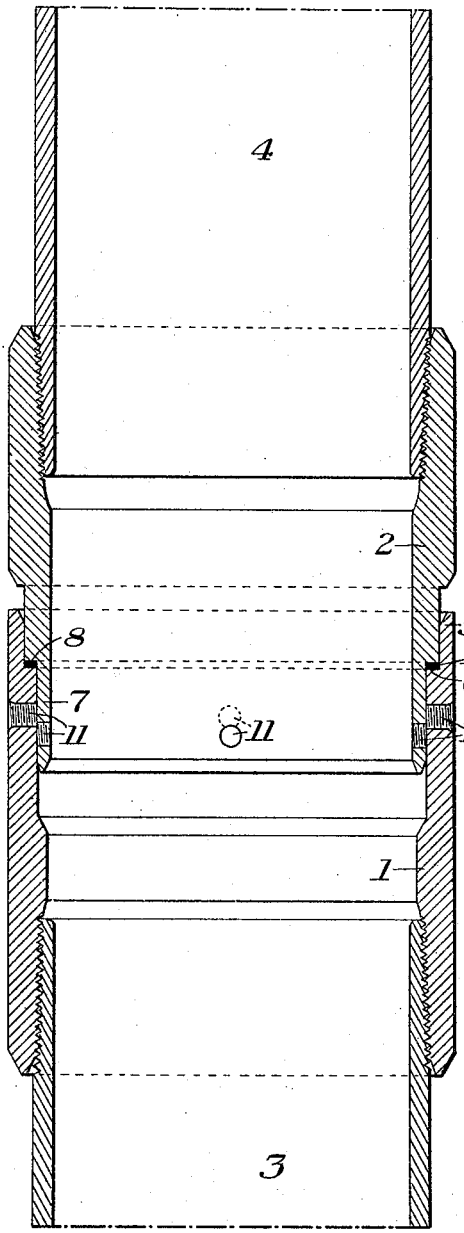

July 15, 1924.

C. M. HEETER

RELEASE COUPLING

Filed June 21, 1922

1,501,217

INVENTOR
Charles M. Heeter
By Byrnes, Stebbins & Parmelee,
his attys

Patented July 15, 1924.

1,501,217

UNITED STATES PATENT OFFICE.

CHARLES M. HEETER, OF BUTLER, PENNSYLVANIA.

RELEASE COUPLING.

Application filed June 21, 1922. Serial No. 569,847.

*To all whom it may concern:*

Be it known that I, CHARLES M. HEETER, a citizen of the United States, residing at Butler, in the county of Butler and State of Pennsylvania, have invented a new and useful Improvement in Release Couplings, of which the following is a full, clear, and exact description.

My invention relates to release couplings for well-casings. It has for its object to provide a joint of simple construction which will be easy to assemble and more efficient in operation than the known constructions.

It has heretofore been proposed to provide a release coupling comprising a pair of interengaging relatively movable members having a packing member interposed between the movable members and adapted to be compressed thereby, for sealing the joint. Such packing member, however, was not subjected to compression on all its surfaces, so that at least one side of the member was left exposed when the parts of the joint were in the packed position; and hence it was found desirable to employ a second packing member in order to insure the efficient sealing of the joint. By my invention I overcome this defect by so constructing the relatively movable coupling members as to completely surround the packing member and subject it to compression on all sides in the packed position of the joint, whereby a single packing member will insure the efficient packing of the joint.

In order to facilitate assembly of the coupling and protect the packing member against mutilation, I further provide means for relatively positioning the coupling members.

In the drawings, which illustrate the preferred embodiment of the invention,—

Figure 1:
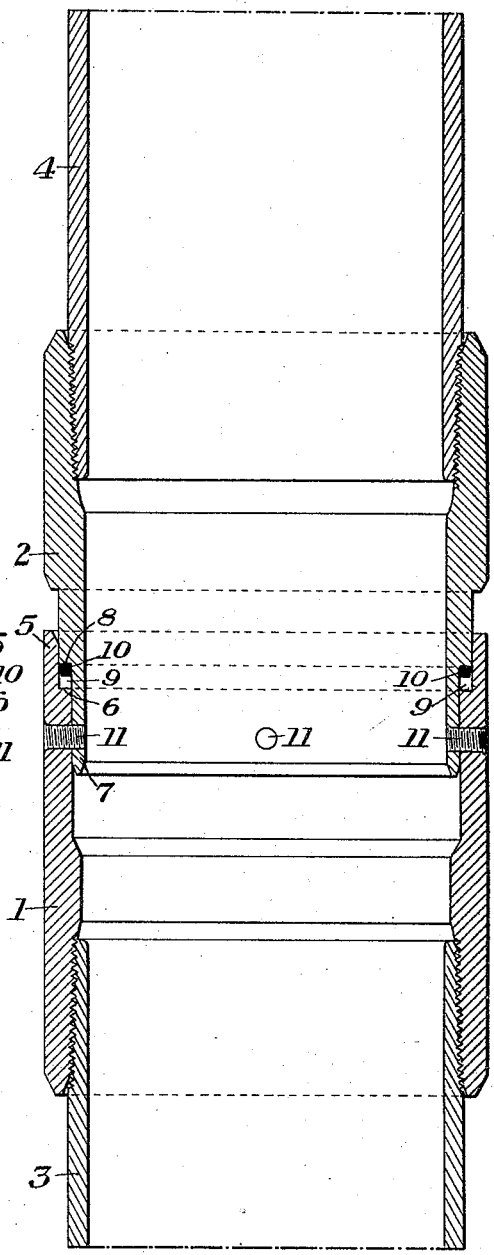

Figure 1 is a central longitudinal sectional view of the release coupling, showing the positions of the parts before packing; and Figure 2 is a view similar to Figure 1, showing the positions of the parts after packing.

Referring to the illustrated embodiment of the invention, 1 and 2 represent a pair of telescoping coupling members internally threaded at one end, respectively, for engagement with the casing or pipe sections 3 and 4. The outer telescoping member 1 has an end portion 5 of greater internal diameter than the body portion of the member 1 and an inwardly facing shoulder 6 at the base of said end portion. The inner telescoping member 2 is provided with an end portion 7 having a smaller external diameter than that of the body portion of the member 2, and has an outwardly facing shoulder 8 at the base of said end portion. In the assembled position of the coupling members, as shown in the drawings, the end portion 7 of the member 2 fits within the body portion of the member 1, and the body portion of the member 2 fits within the end portion 5 of the member 1, and the shoulders 6 and 8 are opposed to each other.

It will be seen, by reference to Figure 1, that the shoulders 6 and 8 and the end portions 5 and 7 define a completely closed annular space 9, and within this space is arranged the packing member 10. In order to hold the coupling members 1 and 2 against relative movement, and with the shoulders 6 and 8 spaced apart so as not to compress the packing member, they are fastened together by screw threaded bolts 11 of soft metal or other frangible material so that when it is desired to pack the joint said bolts may be sheared off by the co-action of the coupling members upon each other.

When the coupling members 1 and 2 are forced together to pack the joint, the shoulders 6 and 8 act upon the upper and lower faces of the packing member 10 to compress it and consequently squeeze it laterally into firm engagement with the side walls of the end portions 5 and 7. The packing member is thus surrounded and compressed on all sides, and it is practically impossible with this construction for any gas or liquid to pass the joint. Thus a single packing member is all that is required to insure an absolutely leak-proof joint. The construction is much simpler than the known constructions, and much more efficient because the entire surface area of the packing is fully utilized.

The packing employed is preferably of elastic material, such as a rubber ring, and prior to assembling the parts this rubber ring is stretched over the end portion 7 of the coupling member 2 and positioned against the shoulder 8.

In order to facilitate the assembly of the coupling members and to prevent mutilation of the elastic packing during such assembly, the end portion 7 of the member 2 is made slightly longer than the end portion 5 of the member 1, so that, in telescopically engaging the members 1 and 2, the end portion 7 enters the bore of the body portion of the member 1 and thereby centers the member 2 with respect to the member 1 in advance of the entrance of the body portion of the member 2 into the bore of the end portion 5 of the member 1. This is an important feature of the construction, because it avoids any chance of the elastic packing striking against the end of the end portion 5 of the member 1 and thus being mutilated as the coupling members are relatively positioned for telescopic interengagement.

The present invention is not limited to the exact details of construction disclosed, but may be otherwise embodied within the scope of the following claims.

I claim:

1. A release coupling comprising two telescoping coupling members and a packing interposed between and entirely surrounded by said members in the unpacked as well as the packed position of the joint, substantially as described.

2. A release coupling comprising two telescoping coupling members having opposed shoulders, and a packing interposed between said shoulders and entirely surrounded by said members in the unpacked as well as the packed position of the joint, substantially as described.

3. A release coupling comprising two telescoping coupling members, a packing interposed between and entirely surrounded by said members in the unpacked as well as the packed position of the joint and adapted to be compressed between said members and frangible means securing said members against relative movement and in such relative position as to maintain said packing uncompressed, substantially as described.

4. A release coupling comprising two telescoping coupling members having opposed shoulders, a packing interposed between said shoulders and entirely surrounded by said members in the unpacked as well as the packed position of the joint, and frangible means holding said members against relative movement with said shoulders spaced a greater distance apart than the thickness of said packing, substantially as described.

5. A release coupling comprising two telescoping coupling members, a packing element arranged upon one of said members and adapted to be compressed between said members for sealing the joint therebetween, and means carried by one of said members for engaging the other of said members for relatively positioning said members in advance of the engagement of the body portion of the member carrying said means with the other member, substantially as described.

6. A release coupling comprising two telescoping members, the outer member having an end portion of increased internal diameter to receive the body portion of the inner member, the inner member having an end portion of reduced external diameter to fit the bore of the body portion of the outer member and a shoulder at the base of said end portion, and a packing element adapted to be arranged on the end portion of the inner member against said shoulder, the end portion of the inner member being of greater length than the end portion of the outer member whereby the said end portion enters the bore of the body portion of the outer member and centers the inner member with respect to the outer member in advance of the entrance of the body portion of the inner member into the bore of the end portion of the outer member, substantially as described.

In testimony whereof I have hereunto set my hand.

CHARLES M. HEETER.